S. B. WENGER.
DRINKING FOUNTAIN AND FEEDER FOR POULTRY.
APPLICATION FILED MAY 17, 1920.
1,347,425.
Patented July 20, 1920.
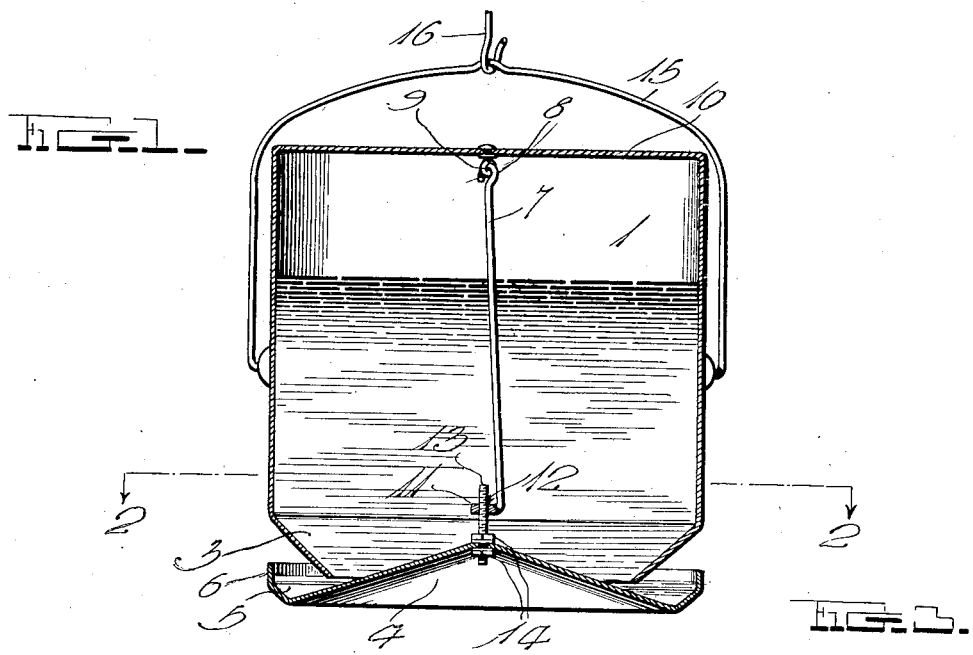
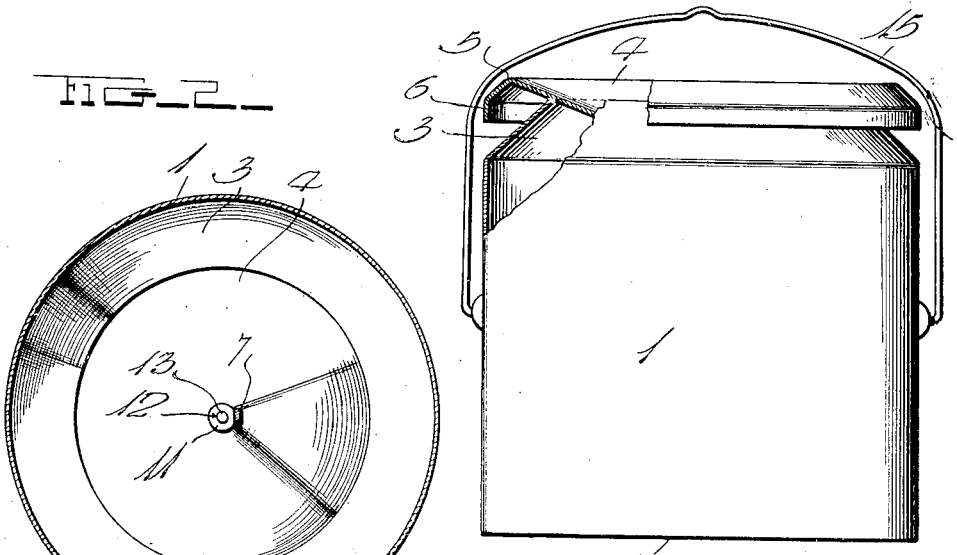
Witness
H. Woodard
Inventor
S. B. Wenger
By H. B. Wilson
Attorneys

UNITED STATES PATENT OFFICE.

SOLOMON B. WENGER, OF SOUTH ENGLISH, IOWA.

DRINKING-FOUNTAIN AND FEEDER FOR POULTRY.

1,347,425.

Specification of Letters Patent.

Patented July 20, 1920.

Application filed May 17, 1920. Serial No. 381,981.

*To all whom it may concern:*

Be it known that I, SOLOMON B. WENGER, a citizen of the United States, residing at South English, in the county of Keokuk and State of Iowa, have invented certain new and useful Improvements in Drinking-Fountains and Feeders for Poultry; and I do declare the following to be a full, clear, and exact description of the invention, such as will enable others skilled in the art to which it appertains to make and use the same.

This invention relates to an improved drinking fountain and feed holder for poultry and one object of the invention is to provide a fountain and feed holder which is so constructed that the tray or trough which receives the feed or water from the reservoir or hopper may be adjustably connected with the reservoir and suspended from the same when the device is in an operative position and to further so mount this trough that it may have transverse movement, thus permitting feed in the reservoir to be shaken and caused to feed down into the trough.

Another object of the invention is to so mount this tray that it may be removed when desired to fill or clean the tray and reservoir.

Another object of the invention is to so construct this device that the reservoir may provide a bucket and the tray a cover for the bucket when the device is inverted and used for carrying water or feed.

Another object of the invention is to so construct the device that it will be very simple in construction and very efficient in operation.

This invention is illustrated in the accompanying drawings wherein—

Figure 1 is a vertical sectional view showing the device in position for use.

Fig. 2 is a transverse sectional view taken along the line 2—2 of Fig. 1.

Fig. 3 is a side elevation showing the receptacle used as a bucket.

This improved drinking fountain and feed holder is provided with a receptacle or hopper 1 which is open at one end and has its walls tapering toward the open end and thus providing a frusto-conical neck 3. Therefore, when the device is in use, the hopper or receptacle has its walls converging toward the open end so that the feed or water will be delivered to the conical central portion of the tray 4. This tray 4 which forms a cover when the device is used as a bucket, as shown in Fig. 3, has its outer peripheral portion bent to provide a trough 5, which trough is provided with an outer wall 6. The tapered portion of the receptacle extends down into the trough below the upper edge of the wall 6 as shown in Fig. 1 and therefore when the device is used to carry water as a drinking fountain a water seal will be formed about the open lower end of the reservoir and the water will be confined in the reservoir and only feed out of the same into the trough as it is consumed or evaporates from the trough.

In order to hold the tray in place there has been provided a hanger-rod 7 which is provided at one end with a hook 8 for engaging an eye 9 secured in the head 10 of the reservoir. The second end portion of this rod is bent to provide a foot 11 in which is formed a threaded opening 12 through which is passed the threaded bolt or stem 13. This bolt passes through the center of the tray 4 and is held tightly in place by the securing nuts 14, a suitable seal being provided about the bolt to prevent water from leaking through the tray. This can consist of a suitable gasket or the bolt may be soldered in place and thus a tight joint provided. Since the stem is rigidly connected with the cover, it will turn with the cover and therefore the cover or tray can be positioned with the end of the bolt extending into the threaded opening and the cover then turned to engage the threads of the stem and opening. After the cover has been connected with the rod, the bail 15 which has been used for carrying the bucket as shown in Fig. 3 will be connected with a hook or other hanger 16 and the receptacle will swing to the position shown in Fig. 1. If it is found that the tray is too close to the open end of the reservoir or not close enough, this can be remedied by turning the tray in the proper direction to move the stem through the threaded opening and thus move the tray closer to or farther away from the open end of the reservoir. The water or other liquid food will flow into the trough 5 and as soon as the trough is filled beyond the open lower end of the reservoir, a water seal will be formed which will shut off the entrance of air to the reservoir and prevent the liquid in the receptacle from feeding out of the same until a portion of the liquid in the trough has been consumed or has evaporated. If dry feed, such as corn meal or cracked corn, oyster shell, gravel or the like, has been placed in the receptacle, this dry feed or granular material will feed into the trough. As the chickens peck the corn meal or other substance from the trough this will cause the tray to move transversely to a certain extent with a swinging movement and this will cause the material in the hopper to be agitated and feed down into the trough. It will thus be seen that with this construction the liquid or dry contents of the receptacle will be fed properly into the trough and will be continuously fed in the trough as it is consumed. After the receptacle is empty, the bail will be released from the hook 16 and the receptacle may be swung to the reverse position shown in Fig. 3 and the cover removed by turning. The receptacle and tray can then be thoroughly cleaned and the receptacle refilled or used as a bucket if desired.

I claim:

1. A receptacle of the character described comprising an open-ended hopper having its walls converging toward the open end of the receptacle, a rod connected with the head of the hopper for swinging movement and having its free end portion bent to provide a foot having a threaded opening formed therein, a tray having a conical central portion for extending into the open end of the hopper and having its peripheral portion bent to provide a trough extending about the walls of the hopper, a threaded stem in the center of the tray extending into the hopper and through the threaded opening in the foot of the hanger-rod, and means carried by the hopper for supporting the same.

2. A drinking fountain and feed holder comprising a receptacle open at one end, a hanger-rod connected with the head of the receptacle for swinging movement, a tray for closing the open end of the receptacle having its outer portion bent to provide a trough extending about the walls of the receptacle at the open end thereof, a threaded stem at the center of the tray extending into the receptacle and passing through a threaded opening in the free end portion of the hanger-rod, and a bail connected with the receptacle for supporting the receptacle with the bail extending above the closed end of the receptacle or above the open end and tray.

In testimony whereof I have hereunto set my hand.

SOLOMON B. WENGER.